United States Patent [19]

Cler et al.

[11] Patent Number: 4,865,343
[45] Date of Patent: Sep. 12, 1989

[54] STEERING MECHANISM FOR A VEHICLE

[75] Inventors: Edward C. Cler, Villa Grove; Kenneth R. Cler, Camargo, both of Ill.

[73] Assignee: Pauls's Machine and Welding Corporation, Villa Grove, Ill.

[21] Appl. No.: 244,340

[22] Filed: Sep. 15, 1988

[51] Int. Cl.$^4$ .............................................. B62D 7/00
[52] U.S. Cl. ..................... 280/91; 280/95.1; 180/234
[58] Field of Search ................. 180/234, 236; 280/91, 280/95.1, 846

[56] References Cited

U.S. PATENT DOCUMENTS

| 2,358,236 | 9/1944 | Lee | 280/91 |
| 2,411,570 | 11/1946 | Hawkins | 280/91 |
| 3,236,324 | 2/1966 | Levratto | 180/234 |
| 3,521,849 | 7/1970 | Whitehead | 280/91 |
| 3,666,034 | 5/1972 | Stuller et al. | 180/6.48 |

FOREIGN PATENT DOCUMENTS

| 1098832 | 2/1961 | Fed. Rep. of Germany | 280/91 |
| 1172131 | 6/1964 | Fed. Rep. of Germany | 280/91 |
| 1655323 | 2/1971 | Fed. Rep. of Germany | 280/91 |
| 1118073 | 6/1959 | France | 280/91 |

Primary Examiner—Kenneth R. Rice
Attorney, Agent, or Firm—Wood, Dalton, Phillips Mason & Rowe

[57] ABSTRACT

A vehicle is provided having a horizontal frame with two associated front wheels and two associated rear wheels wherein at least one set of associated wheels is rotatable about vertical axes by steering means. A cross shaft is mounted on the frame and rotatable about its axis in response to a steering input of an operator. A first shaft arm defining a first pivot is rotatable with the cross shaft, and a second shaft arm defining a second pivot is rotatable with the cross shaft. The second pivot has a radial spacing from the shaft axis equal to the radial spacing of the first pivot from the cross shaft, and the pivots are substantially symmetrical on opposite sides of a horizontal plane when the steering mechanism is in a neutral position. First and second steering arms are pivotable about the vertical pivot axes of the set of associated wheels to turn the wheels, and the steering arms define third and fourth pivots located on opposite sides of their associated vertical axes. First rigid elongate means connect the first pivot to the third pivot, and second rigid elongate means connect the second pivot to the fourth pivot.

9 Claims, 2 Drawing Sheets

STEERING MECHANISM FOR A VEHICLE

TECHNICAL FIELD OF THE INVENTION

The present invention relates to vehicles, and more specifically, to the steering mechanism for farm vehicles adapted for use with row crops.

BACKGROUND OF THE INVENTION

In the farming of row crops, wheeled vehicles have been developed to treat many different crops. These vehicles are operated under conditions to which they must conform in order to give satisfactory service.

In carrying out a particular operation, it is customary and necessary that the vehicle be turned once it has reached the end of a treated row of crops so that the next row of crops can be treated.

Many of these vehicles are deficient in their turning operation since they do not have a turning radius such that they may be maneuvered to make the extremely sharp turns which they are often required to make, and often they slide one or more wheels when turning to undesirably dig ruts in the ground.

The present invention is directed to solving the above-mentioned problem.

SUMMARY OF THE INVENTION

In one aspect of the present invention, a vehicle is provided having a horizontal frame with two associated front wheels and two associated rear wheels wherein at least one set of associated wheels is rotatable about vertical axes by steering means. A cross shaft is mounted on the frame and rotatable about its axis in response to a steering input of an operator. A first shaft arm defining a first pivot is rotatable with the cross shaft, and a second shaft arm defining a second pivot is rotatable with the cross shaft. The second pivot has a radial spacing from the shaft axis equal to the radial spacing of the first pivot from the cross shaft, and the pivots are substantially symmetrical on opposite sides of a horizontal plane when the steering mechanism is in a neutral position. First and second steering arms are pivotable about the vertical pivot axes of the set of associated wheels to turn the wheels, and the steering arms define third and fourth pivots located on opposite sides of their associated vertical axes. First rigid elongate means connect the first pivot to the third pivot, and second rigid elongate means connect the second pivot to the fourth pivot.

In another aspect of the present invention, the vertical pivot axes and the third and fourth pivots all lie in substantially the same plane when the steering means is in a neutral position.

In yet another aspect of the present invention, the elongate means each comprise a tie rod.

In still another aspect of the present invention, the cross shaft is comprised of first and second telescoping splined portions allowing the wheel base width to be varied.

In still another aspect of the present invention, the cross shaft is mounted, at opposite ends, to first and second bearing brackets fixed to the frame. The first and second bearing brackets further include first and second bearings to allow the vehicle to drive over uneven ground.

DESCRIPTION OF THE PREFERRED EMBODIMENT

Figure 1:
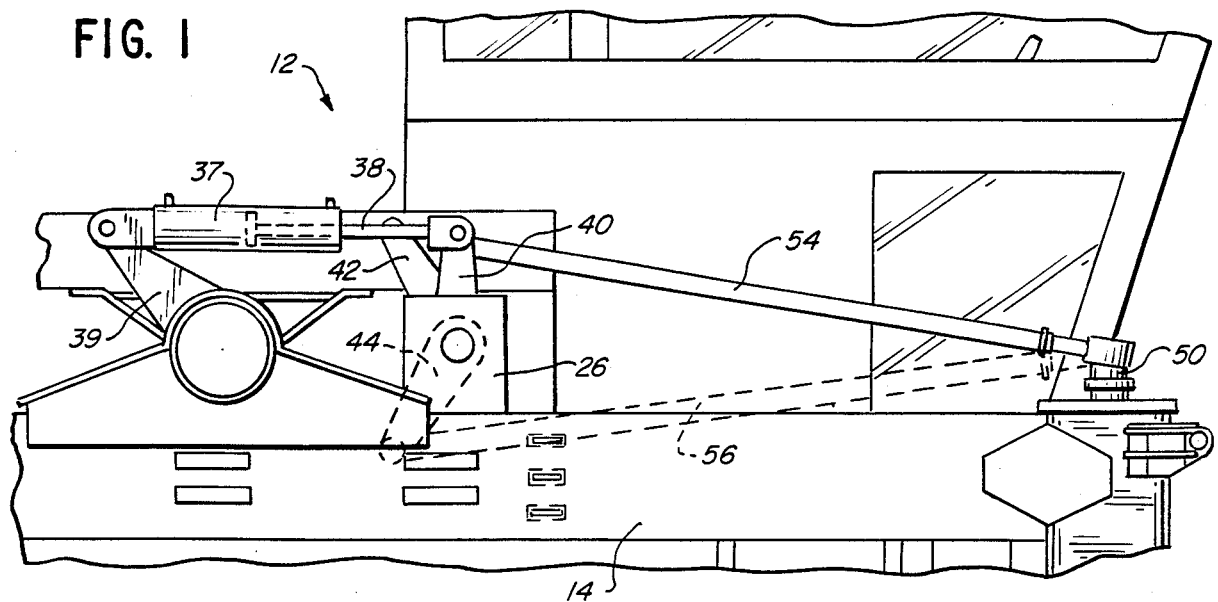
FIG. 1 is a side view illustrating a vehicle incorporating the steering mechanism of the present invention.

A vehicle 12 incorporating the steering mechanism of the present invention includes a horizontal frame 14, two associated front wheels 16, 18 and two associated rear wheels (not shown).

In an exemplary embodiment of the present invention, the front wheels 16, 18 are mounted to first and second wheel shafts 20, respectively. The first and second wheel shafts 20 are pivotable about vertical axes 11 (see FIG. 2) to turn the front wheels 16, 18 by means of a steering mechanism to be described hereinafter. Although not shown in FIG. 4, it is noted that front wheel 18 on the opposite side of the horizontal frame 14 is mounted to the second shaft wheel in a like manner. Also, although the steering mechanism is illustrated as turning the front wheels 16, 18, it may also be used where desirable to turn the rear wheels as well.

Referring back to FIGS. 1 and 2, the steering mechanism of the present invention includes a cross shaft 24 mounted at opposite ends to bearing brackets 26, 28 fixed to the horizontal frame 14. The bearing brackets 26, 28 include floating spherical bearings 30, 32 which allow the vehicle 12 to drive over uneven ground without bending the steering mechanism. The cross shaft 24 has two splined telescoping portions 34, 36 allowing the wheel base width to be varied.

The cross shaft 24 is rotatable about a horizontal axis in response to a steering input. As shown in FIG. 1, the steering mechanism is powered by a single hydraulic cylinder 37, which is located on one or both sides of the horizontal frame 14, and connected at one end to a cylinder mount 39. At the other end, a piston rod 38 operatively associated with the cylinder 37 is connected to a control steering arm 40 secured to the cross shaft 24 for rotation therewith.

A first shaft arm 42 defining a first pivot 43 is mounted on the cross shaft 24 at one end thereof and is rotatable therewith. A second shaft arm 44 defining a second pivot 45 is mounted to the cross shaft 24 at the other end thereof and is likewise rotatable therewith. The shaft arms 42, 44 have an equal radial spacing from the cross shaft axis, and as best shown in FIG. 1, shaft arms 42, 44 are substantially symmetrical on opposite sides of a horizontal plane when the steering mechanism is in a neutral position.

Figure 2:
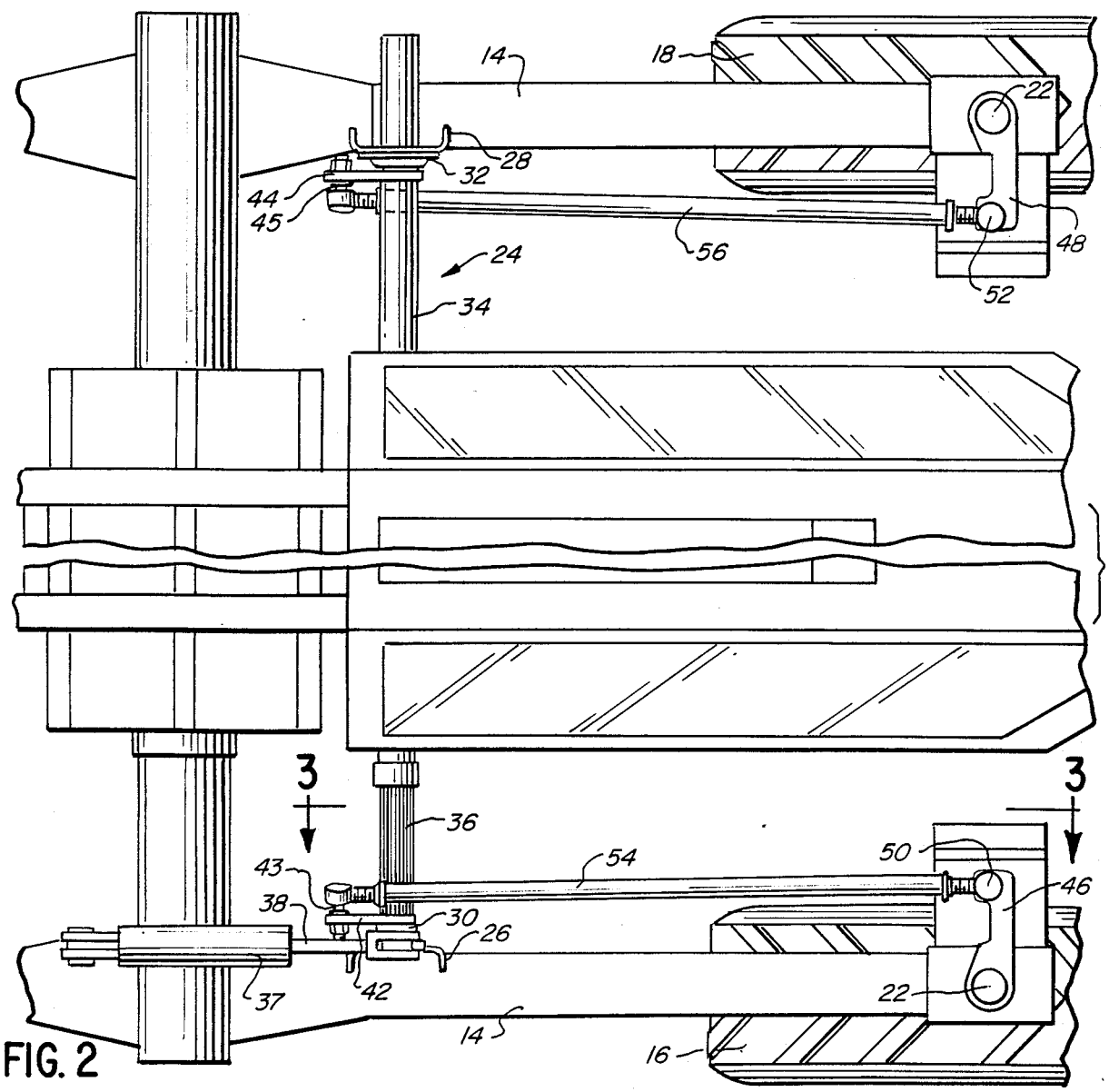
FIG. 2 is a broken top view of the vehicle incorporating the steering mechanism of the present invention.

The steering mechanism further has steering arms 46, 48 which are mounted at one end to the wheel shafts 20 to rotate therewith about the vertical pivot axes 22 (see FIG. 2). The steering arms 46, 48 also define pivots 50, 52 which lie in substantially the same vertical plane when the steering mechanism is in a neutral position.

Figure 3:
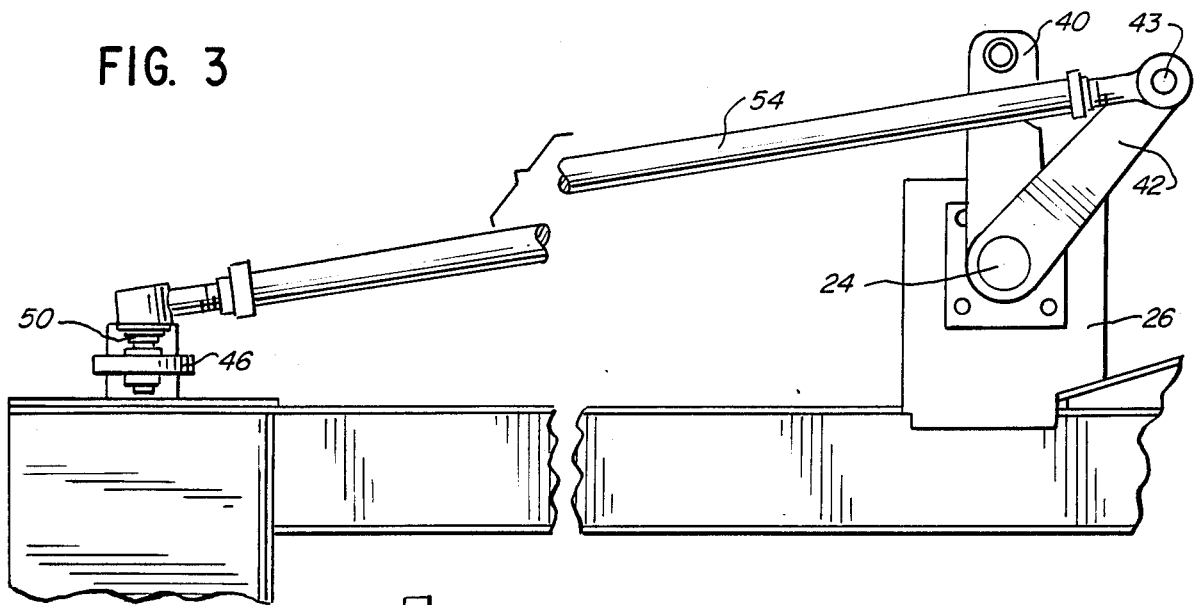
FIG. 3 is a side view illustrating a portion of the steering mechanism on one side of the vehicle, taken generally along line 3—3 of FIG. 2.
Figure 4:
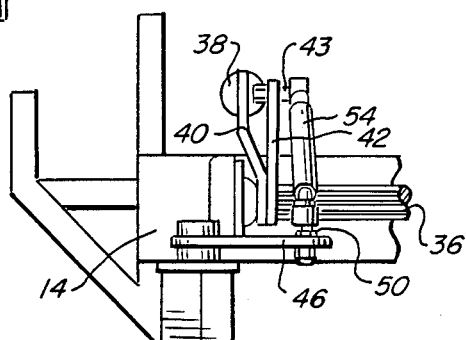
FIG. 4 is a front view illustrating a portion of the steering mechanism on one side of the vehicle.
Figure 4:
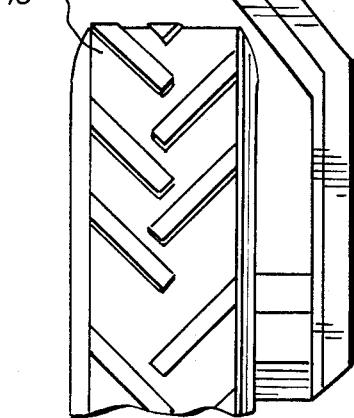

An elongate rigid tie rod 54 is connected at one end to one shaft arm pivot 43 and at the other end to one steering arm pivot 50. A second rigid tie rod 56 connects the other shaft arm pivot 45 to the other steering arm pivot 52. FIGS. 3 and 4 more clearly show the connection between the tie rod 54 and the associated shaft arm 42 and steering arm 46.

The connection between the tie rod 56 and the other shaft arm 44 and steering arm 48 on the other side of the horizontal frame 14 is a mirror image of the connection depicted in FIGS. 3 and 4.

In the preferred method of operation, operation of a suitable steering control (e.g. the turning of a steering wheel by an operator of the vehicle 12) causes a corresponding axial movement of the piston rod 38 associated with the cylinder 37. Assuming for the purposes of this discussion that the operator's control causes the piston rod 38 to extend to the right in FIG. 1, the control steering arm 40 pivots clockwise. Since the control steering arm 40 is mounted to the cross shaft 24, the cross shaft 24 will likewise pivot in a clockwise direction as the control steering arm 40 pivots, as will the shaft arms 42, 44 mounted thereon. Since the tie rods 54, 56 are located on opposite sides of the cross shaft 24, the pivoting of the shaft arms 42, 44 will cause the tie rods 54, 56 to move axially in opposite directions (that is, the tie rod 54 will move axially to the right in FIG. 1 in response to the clockwise movement while the tie rod 56 will move to the left in FIG. 1).

As viewed from FIG. 2, the rightward movement of the tie rod 54 and leftward movement of the tie rod 56 will cause the first and second steering arms 46, 48, connected at tie rod ends 54, to both pivot in a clockwise direction. In turn, this clockwise movement will cause wheel shafts 20 to turn their associated front wheels 16, 18 such that the vehicle 12 would turn right (i.e., down in FIG. 1).

Due to the geometry of the steering mechanism, the inner wheel 16 will turn more than the outer wheel 18 to accommodate for its smaller turning radius. That is, during the turning operation, shaft arm 42 moves its associated tie rod 54 axially forward a greater amount than the other shaft arm 42 moves its associated tie rod 56 axially rearwardly. Thus, the front wheels 16, 18, which are turned along with first and second wheel shafts 20, are turned a different amount.

Similarly, turning in the opposite direction will turn wheel 18 greater than wheel 16, to accommodate for the smaller turning radius of wheel 18 in a lefthand turn.

The steering mechanism of the present invention is useable in, for example, a crop sprayer type vehicle. As a result, the crop sprayer vehicle can be easily steered and will have a short turning radius so that the vehicle may be readily maneuvered for efficient crop spraying without undesirable wheel pushing and slipping. Further, the steering mechanism will improve the tracking ability of the back wheels and reduce the sideways force on the front wheels.

Since the cross shaft of the steering mechanism of the present invention is comprised of two telescopic portions, the front wheels of the crop sprayer vehicle can easily be widened or narrowed so that the vehicle can travel freely between rows of crops or plants.

Other aspects, objects, and advantages of the present invention can be obtained from a study of the specification, drawings and appended claims.

We claim:

1. A vehicle having a horizontal frame with two associated front wheels and two associated rear wheels, at least one set of associated wheels being rotatable about associated vertical axes by steering means comprising:

a cross shaft mounted on the frame and rotatable about its axis in response to a steering input of an operator;

a first shaft arm defining a first pivot and rotatable with the cross shaft;

a second shaft arm defining a second pivot and rotatable with the cross shaft, said second pivot having a radial spacing from said shaft axis equal to the radial spacing of the first pivot from the cross shaft, said pivots being substantially symmetrical on opposite sides of a horizontal plane when said steering means is in a neutral position;

first and second steering arms pivotable about the vertical pivot axes of said set of associated wheels to turn said wheels, said steering arms defining third and fourth pivots located on opposite sides of their associated vertical axes;

first rigid elongate means connecting said first pivot to said third pivot; and second rigid elongate means connecting said second pivot to said fourth pivot.

2. The steering means of claim 1, wherein said vertical pivot axes and said third and fourth pivots all lie in substantially the same plane when the steering means is in the neutral position 3. The steering means of claim 1, wherein the elongate means each comprise a tie rod.

4. The steering means of claim 1, wherein said cross shaft is comprised of first and second telescoping splined portions allowing the wheel base width to be varied.

5. The steering means of claim 1 wherein said cross shaft is mounted at opposite ends thereof to first and second bearing brackets fixed to said frame, said first and second bearing brackets further including first and second bearings to allow the vehicle to drive over uneven ground.

6. A vehicle having a horizontal frame, a pair of spaced front and rear wheels, one of the pair of front and rear wheels being mounted to a pair of wheel shafts pivotable about vertical axes, and steering means on the frame for pivoting said shafts about said vertical axes to turn said wheels, comprising:

a cross shaft mounted on the horizontal frame and rotatable about a horizontal axis in response to a steering input;

a pair of shaft arms, one mounted at each end of said cross shaft and rotatable therewith;

a pair of steering arms, one mounted to each wheel shaft and pivotable about the vertical axis of said wheel shaft; and a pair of tie rods providing a connection between said pair of shaft arms and said steering arms, said pair of shaft arms being configured on said cross shaft to move said respective tie rods axially in opposite directions to pivot said wheel shafts and turn said wheels in the same direction but in different amounts.

7. The vehicle of claim 6, wherein said cross shaft is comprised of first and second telescoping splined portions allowing the distance between said wheels to be varied.

8. The vehicle of claim 6, wherein said cross shaft is mounted at opposite ends thereof to first and second bearing brackets fixed to said frame, said first and second bearing brackets further including first and second bearings to allow the vehicle to drive over uneven ground.

9. A vehicle having a horizontal frame with two associated front wheels and two associated rear wheels, at least one set of associated wheels being rotatable about associated vertical axes by steering means comprising:
- a cross shaft mounted on the frame and rotatable about its axis in response to steering input of an operator, said cross shaft comprising first and second telescoping splined portions allowing the distance between said wheels to be varied, and said cross shaft being mounted at opposite ends thereof to first and second bearing brackets fixed to said frame;
- a first shaft arm defining a first pivot and rotatable with the cross shaft;
- a second shaft arm defining a second pivot and rotatable with the cross shaft, said second pivot having a radial spacing from said shaft axis equal to the radial spacing of the first pivot from the cross shaft, said pivots being substantially symmetrical on opposite sides of a horizontal plane when said steering means is in a neutral position;
- first and second steering arms pivotable about the vertical pivot axes of said set of associated wheels to turn said wheels, said steering arms defining third and fourth pivots located on opposite sides of their associated vertical axes, and said vertical pivot axes and said third and fourth pivots all lying in substantially the said plane when the steering means is in the neutral position;
- a first tie rod connecting said first pivot to said third pivot; and
- a second tie rod connecting said second pivot to said fourth pivot.

* * * * *